July 31, 1923.

S. L. HALL

BRAKE IRON

Filed Aug. 14, 1922

1,463,693

WITNESSES
F.R.Walker

INVENTOR
Samuel L. Hall
BY
ATTORNEYS

Patented July 31, 1923.

1,463,693

UNITED STATES PATENT OFFICE.

SAMUEL L. HALL, OF CUSHING, OKLAHOMA.

BRAKE IRON.

Application filed August 14, 1922. Serial No. 581,708.

*To all whom it may concern:*

Be it known that I, SAMUEL L. HALL, a citizen of the United States, and a resident of Cushing, in the county of Payne and State of Oklahoma, have invented a new and Improved Brake Iron, of which the following is a full, clear, and exact description.

This invention relates to improvements in brake irons, an object of the invention being to provide an iron which is strong and rigid, which can be rigidly secured to the brake beam, and which supports the brake shoe so that the latter may be adjusted when worn.

A further object is to provide a brake iron which may be cast or formed in a single piece, which will be strong and durable in use and which will most efficiently perform the functions for which it is intended.

With these and other objects in view, the invention consists in certain novel features of construction and combinations, and arrangement of parts, as will be more fully hereinafter described and pointed out in the claims.

In the accompanying drawings—

Figure 1:
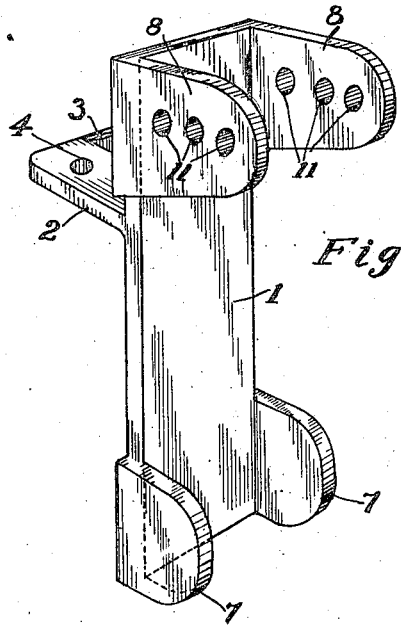
Figure 1 is a perspective view of my improved brake iron.
Figure 2:
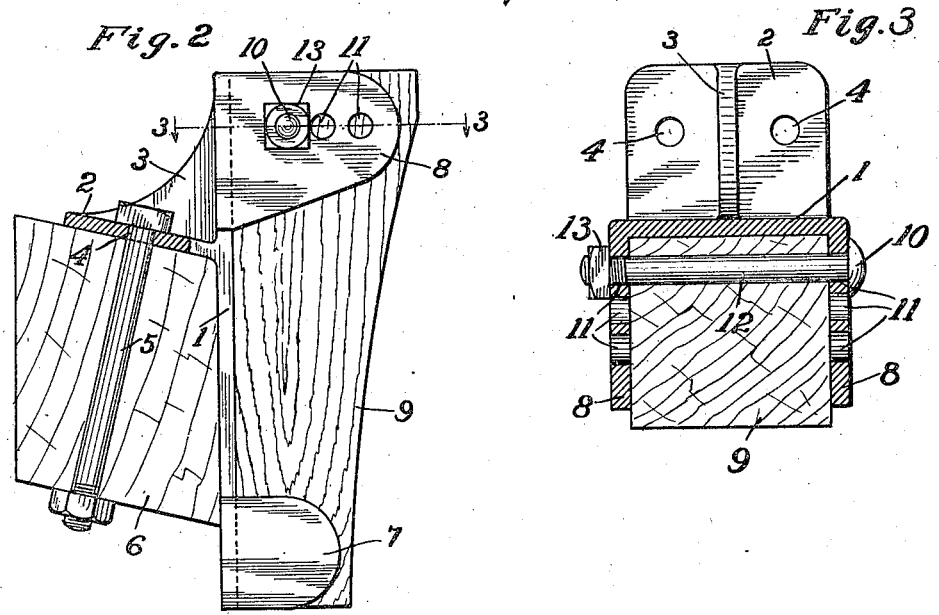
Figure 2 is a view in side elevation partly in section showing the brake iron in operative position.
Figure 3:
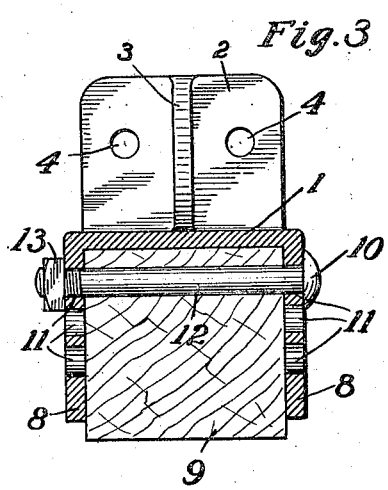
Figure 3 is a view in transverse section on the line 3—3, of Figure 2.

1 represents the body portion of my improved brake iron which is preferably of general oblong shape and is provided at its rear adjacent its upper end, with an integral bracket 2 strengthened by a central web 3 and provided with a pair of bolt openings 4 for the reception of bolts 5 which are projected through the brake beam 6 to secure the iron thereto. By providing two of these bolt openings for the reception of a pair of bolts, the iron can be rigidly secured to the beam and prevent lateral displacement.

At the lower end of the body portion 1 and at the side edges thereof, forwardly projecting tongues 7 are provided, and at the upper end of the body portion 1 and at the edges thereof longer integral tongues 8 are provided.

Between these pairs of tongues 7 and 8 and against the body 1, the brake shoe, or block 9 is supported and is secured in position by means of a bolt 10 which is projected through any of a series of openings 11 in the tongues 8, through an opening 12 in the shoe and secured by means of a nut 13.

While I refer to this securing member 10 as a bolt, it is obvious that it may constitute any form of pin, which may be suitable for the purpose.

As the shoe, or block 9 wears, it may be adjusted forwardly by positioning the bolt 10 in any of the series of openings 11 so that the block may be used until relatively thin and at all times properly function to frictionally engage the wheel.

It will be noted that the tongues 7 and 8 prevent possibility of lateral displacement of the shoe and hold the latter rigid in any position of adjustment.

While my improved brake iron is especially adapted for use in connection with wagons, the invention is not limited to any particular use, and various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A brake iron, comprising a body portion, an integral bracket projecting rearwardly from the body portion and having a plurality of bolt openings therein, and forwardly projecting tongues at the edges and at both ends of the body portion.

2. A brake iron, comprising a body portion, an integral bracket projecting rearwardly from the body portion and having a plurality of bolt openings therein, and forwardly projecting tongues at the edges and at both ends of the body portion, one pair of said tongues having an aligned series of openings therein for the reception of a shoe securing device.

3. The combination with a brake beam, an iron, a bracket on the iron, a pair of bolts securing the bracket on the beam, a pair of parallel tongues at the upper end of the iron, a pair of parallel tongues at the lower end of the iron, a brake shoe located against the iron and between the tongues and having an opening therein, one pair of said tongues having a series of openings therein, and a securing device projecting through openings in the said tongues and through the opening in the shoe whereby the position of the shoe may be adjusted relative to the iron.

SAMUEL L. HALL.